US008007009B2

(12) United States Patent
Vogel et al.

(10) Patent No.: US 8,007,009 B2
(45) Date of Patent: Aug. 30, 2011

(54) MALE COUPLING FOR CONNECTING TO FEMALE THREADED COUPLING

(75) Inventors: Todd Jerome Vogel, Waterville, OH (US); Jason W. Dahms, Bowling Green, OH (US); Michael P. Wells, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 499 days.

(21) Appl. No.: 12/049,787

(22) Filed: Mar. 17, 2008

(65) Prior Publication Data

US 2008/0224471 A1    Sep. 18, 2008

Related U.S. Application Data

(60) Provisional application No. 60/895,036, filed on Mar. 15, 2007.

(51) Int. Cl.
*F16L 37/00* (2006.01)

(52) U.S. Cl. .......................................... 285/35; 285/316

(58) Field of Classification Search .................... 285/34, 285/35, 308, 315, 322, 314, 316, 323, 324, 285/361, 395, 396
See application file for complete search history.

(56) References Cited

U.S. PATENT DOCUMENTS

| | | | | |
|---|---|---|---|---|
| 2,994,381 A | * | 8/1961 | Brown | 166/208 |
| 3,159,075 A | * | 12/1964 | Bjork | 411/65 |
| 4,376,525 A | * | 3/1983 | Fremy | 251/149.6 |
| 4,601,492 A | * | 7/1986 | George | 285/3 |
| 5,788,443 A | | 8/1998 | Cabahug | |
| 5,996,654 A | | 12/1999 | Green | |
| 6,554,324 B1 | * | 4/2003 | Herman | 285/322 |
| 2003/0155763 A1 | * | 8/2003 | Wolf et al. | 285/39 |
| 2004/0070197 A1 | * | 4/2004 | Densel et al. | 285/39 |

OTHER PUBLICATIONS www.faster.it; Think Faster, Quick-Release Couplings and Multiconnections; Applicant became aware of this publication at least as early as Aug. 2007.
Faster News; Pressure Tight Connections; Jun. 2006.

* cited by examiner

*Primary Examiner* — Michael P Ferguson
*Assistant Examiner* — Gwendolyn Driggers
(74) *Attorney, Agent, or Firm* — Benesch Friedlander Coplan & Aronoff LLP

(57) ABSTRACT

In one embodiment, a male coupling connectable to and separable from a female coupling (e.g., a female threaded port) is provided. The female coupling includes a receiving portion sized to receive at least a portion of the male coupling, where the receiving portion has internal threads provided therein. The male coupling includes a body having a passageway extending therethrough and a locking member disposed about the body and configured to move between locking and releasing positions. The locking member includes a retaining formation configured to engage the internal threads of the female coupling when the locking member is in its locking position. The male coupling further includes a locking sleeve disposed about and axially movable with respect to the body between first and second positions. After insertion of the male coupling into the female coupling and upon movement of the locking sleeve to its first position, the locking sleeve forces the locking member to move to its locking position causing the retaining formation of the locking member to engage the internal threads of the female coupling, thereby locking the male coupling and the female coupling together.

18 Claims, 8 Drawing Sheets

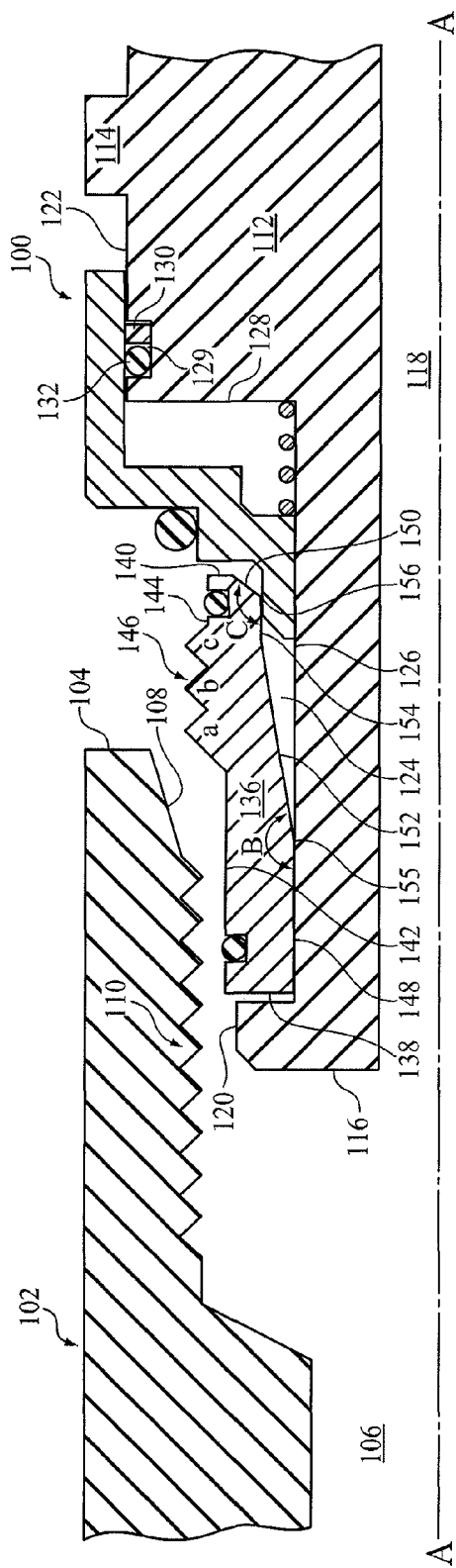
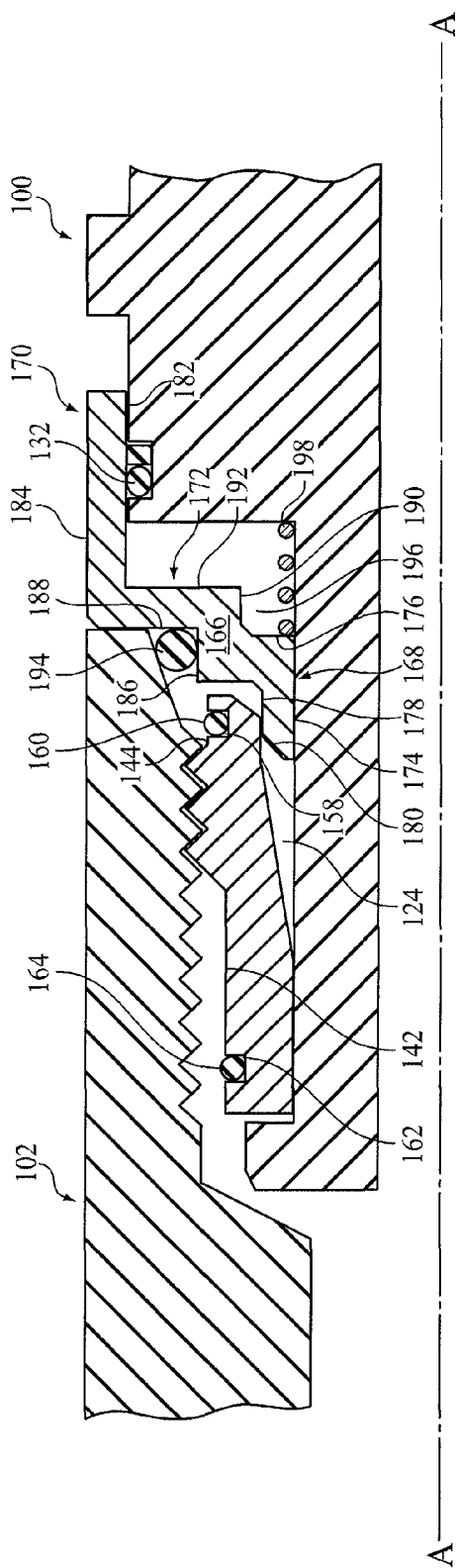
FIG. 1A
FIG. 1B

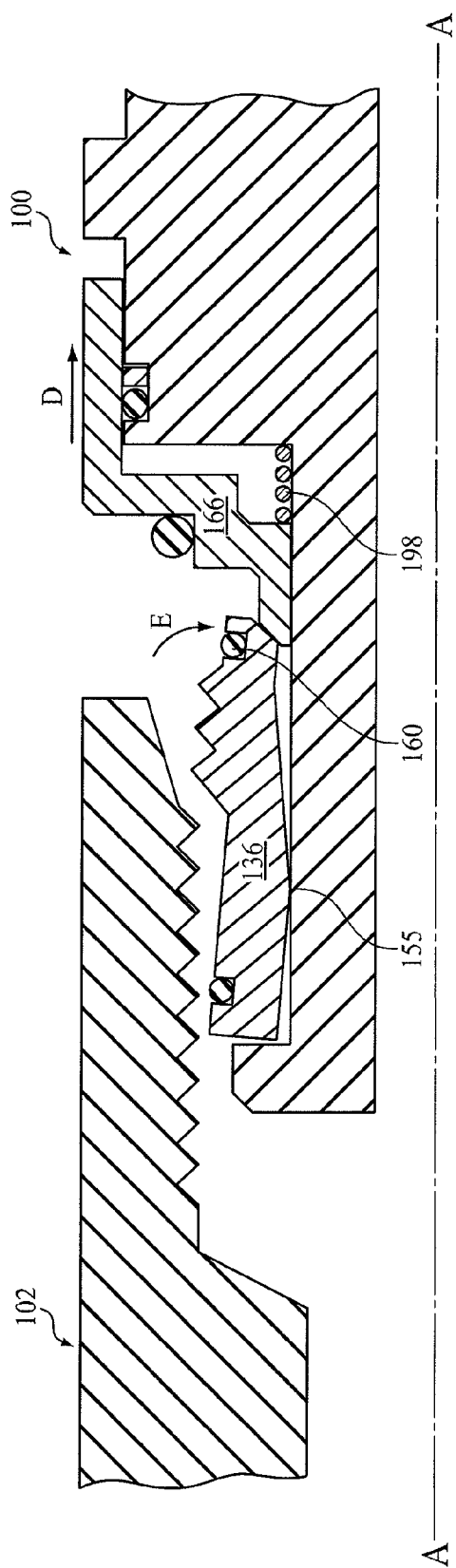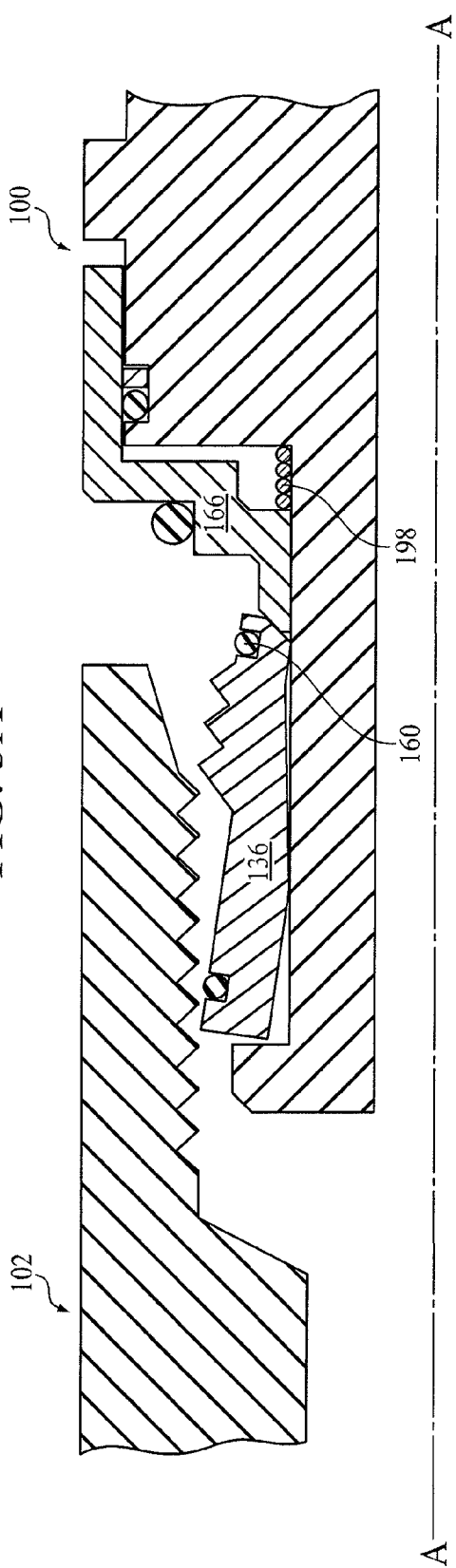
FIG. 3A
FIG. 3B

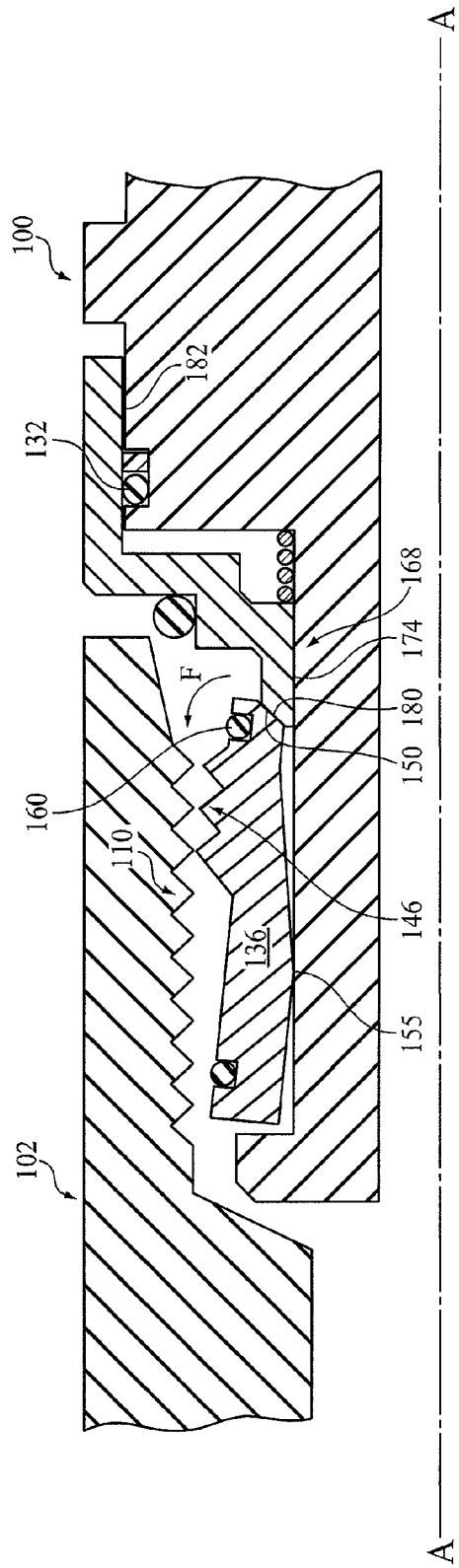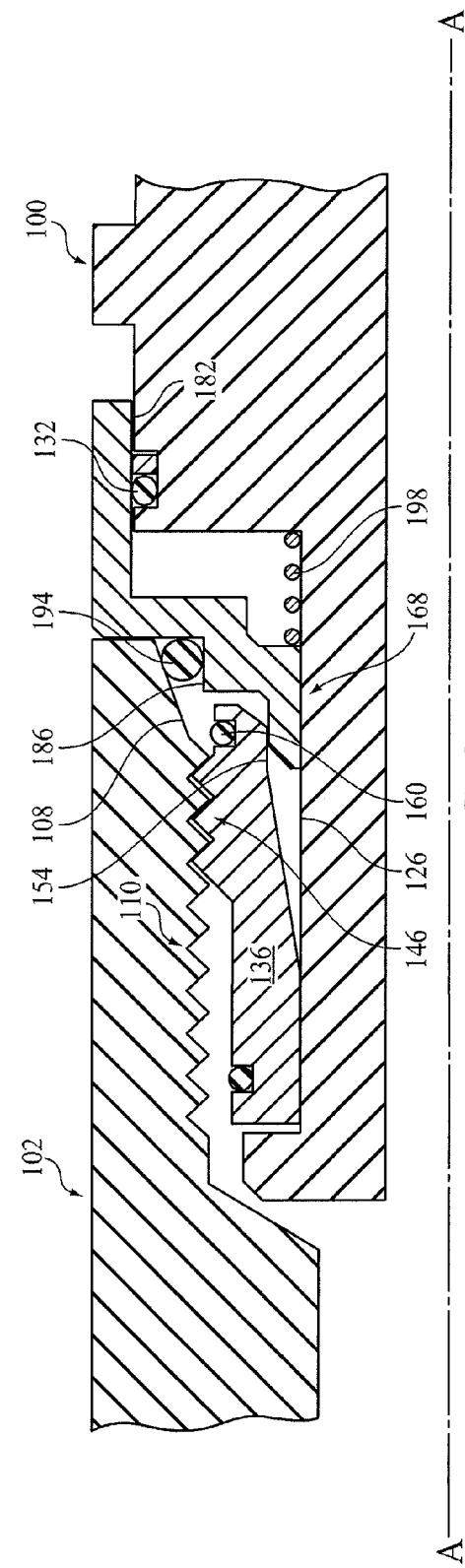
FIG. 3C
FIG. 3D

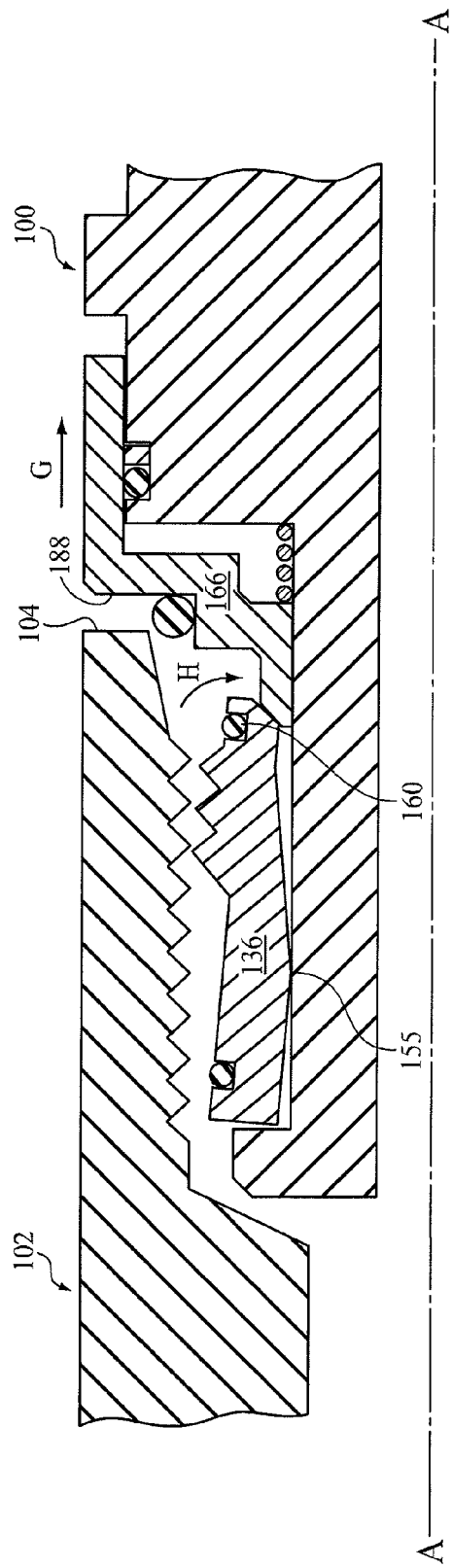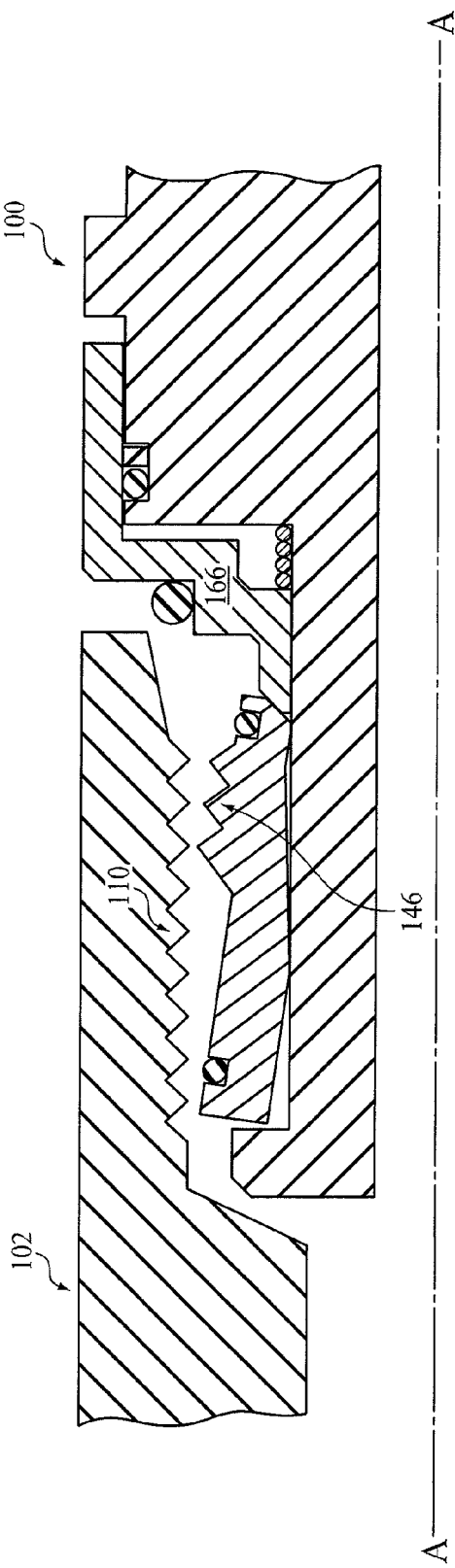
FIG. 4A
FIG. 4B

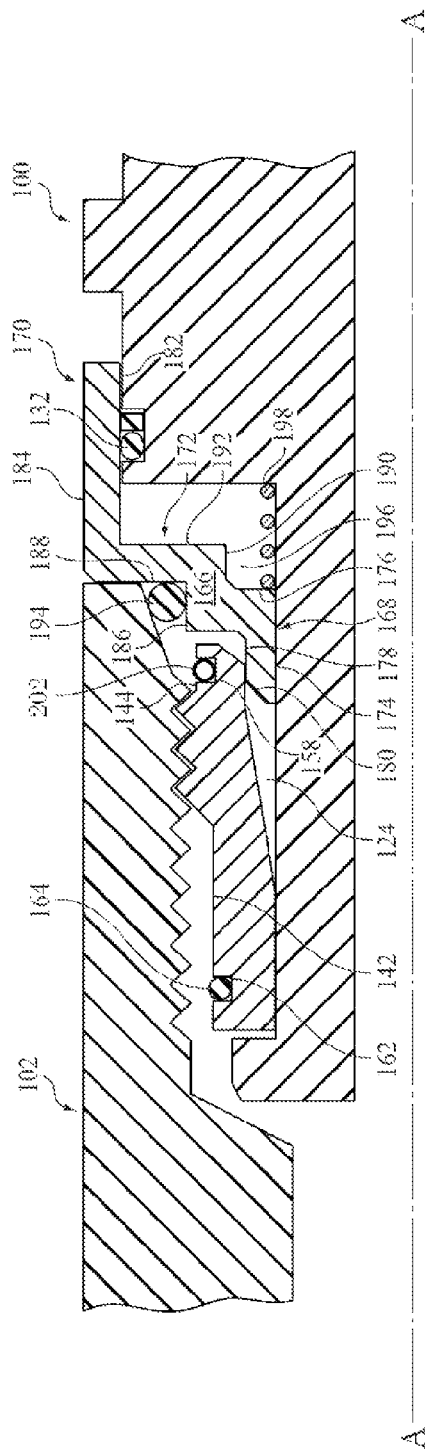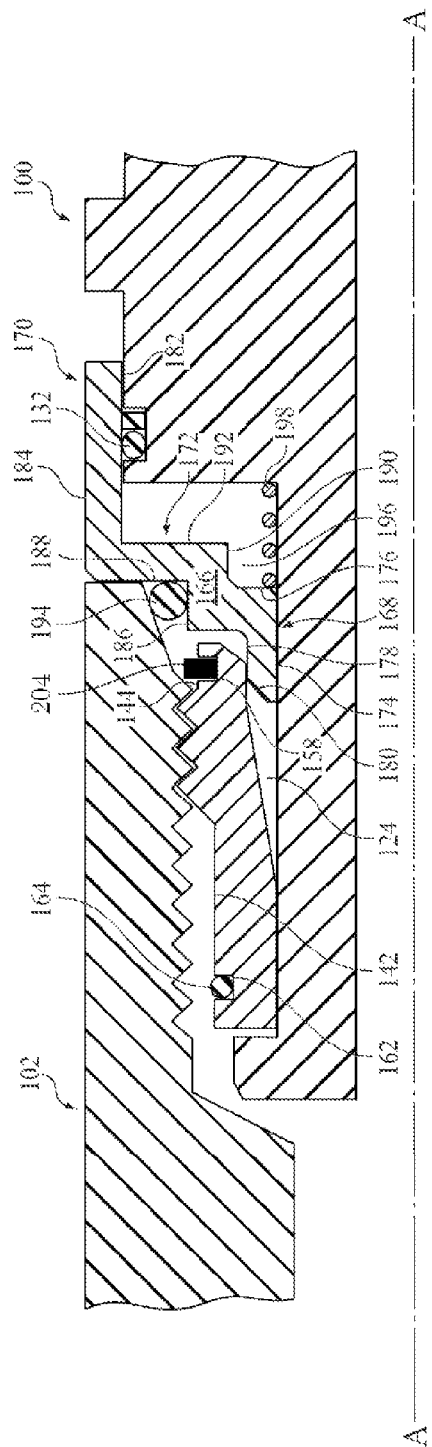
FIG. 5A
FIG. 5B

MALE COUPLING FOR CONNECTING TO FEMALE THREADED COUPLING

CROSS-REFERENCE TO RELATED APPLICATION

This application claims priority to U.S. Provisional Application No. 60/895,036 filed on Mar. 15, 2007, the disclosure of which is hereby incorporated by reference in its entirety herein.

BACKGROUND

1. Field of the Invention

The present application relates to fluid couplings and, more particularly, to fluid couplings that are configured to connect to a female threaded coupling.

2. Description of the Related Art

Coupling assemblies for the transmission of gases or fluids that may be secured together by axial movement of a male coupling into a female coupling are known in the art. In a typical application, a male coupling and a female coupling function as an adapter between a flexible conduit, such as a hose, and an apparatus, such as a pump. While several methods are commonly used to connect the male coupling to the flexible conduit, such as a barbed hose adapter, the female coupling is typically connected to a standard female threaded port in the apparatus.

Manufacturers of coupling assemblies have attempted to reduce complexity and cost by integrating the female coupling directly into their customer's apparatus (known as "direct porting"), thereby eliminating the need for the standard female threaded port. However, customers are oftentimes reluctant to integrate a particular coupling manufacturer's female coupling directly into the apparatus because doing so would make it difficult to convert to a standard female threaded port. Additionally, customers may be reluctant to integrate a particular coupling manufacturer's female coupling directly into the apparatus because doing so would require the customers to purchase all their hoses from the manufacturer of the coupling assembly. There are continual efforts to improve upon the current designs of coupling assemblies, particularly to reduce the complexity and cost of coupling assemblies as well as to design couplings that are compatible with standard fittings (e.g., a standard female threaded port).

SUMMARY

In one embodiment, a male coupling connectable to and separable from a female coupling (e.g., a female threaded port) is provided. The female coupling includes a receiving portion sized to receive at least a portion of the male coupling, where the receiving portion has internal threads provided therein. The male coupling includes a body having a passageway extending therethrough and a locking member disposed about the body and configured to move between locking and releasing positions. The locking member includes a retaining formation configured to engage the internal threads of the female coupling when the locking member is in its locking position. The male coupling further includes a locking sleeve disposed about and axially movable with respect to the body between first and second positions. After insertion of the male coupling into the female coupling and upon movement of the locking sleeve to its first position, the locking sleeve forces the locking member to move to its locking position causing the retaining formation of the locking member to engage the internal threads of the female coupling, thereby locking the male coupling and the female coupling together.

In one embodiment, a male coupling connectable to and separable from a female coupling (e.g., a female threaded port) is provided. The female coupling includes a receiving portion sized to receive at least a portion of the male coupling, where the receiving portion has internal threads provided therein. The male coupling includes a body having a passageway extending therethrough and a plurality of locking member segments disposed about the body. Each locking member segment is movable between locking and releasing positions and includes a retaining formation configured to engage the internal threads of the female coupling when in its locking position. The male coupling further includes a locking sleeve disposed about and axially moveable with respect to the body between first and second positions, where the locking sleeve configured to move the locking member segments to their respective locking positions when the locking sleeve is moved to its first position. Upon movement of the locking sleeve to its second position, the locking member segments move to their respective releasing positions. After the male coupling is inserted into the female coupling and upon movement of the locking sleeve to its first position, the locking sleeve forces the locking member segments to move to their respective locking positions causing the retaining formation of each locking member segment to engage the internal threads of the female coupling, thereby locking the male coupling and the female coupling together.

In one embodiment, a male coupling connectable to and separable from a female coupling (e.g., a female threaded port) is provided. The female coupling includes a sealing surface and a receiving portion sized to receive at least a portion of the male coupling, where the receiving portion has internal threads provided therein. The male coupling includes a body having a passageway extending therethrough and a plurality of locking member segments disposed about the body. Each locking member segment is movable between locking and releasing positions and includes a partial threaded formation configured to engage the internal threads of the female coupling when in its locking position. The male coupling further includes a locking sleeve disposed about and axially moveable with respect to the body between first and second positions. The locking sleeve is configured to move the locking member segments to their respective locking positions when the locking sleeve is moved to its first position and is biased to its first position to maintain the locking member in its locking position. An annular seal is disposed about the locking sleeve. Upon movement of the locking sleeve to its second position, the locking member segments move to their respective releasing positions. After the male coupling is inserted into the female coupling and upon releasing the locking sleeve to its first position, the locking sleeve forces the locking member segments to move to their respective locking positions causing the partial threaded formation of each locking member segment to engage the internal threads of the female threaded coupling, thereby locking the male coupling and the female coupling together, and causing the annular seal to compress against the sealing surface of the female coupling.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as one component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

FIG. 1A illustrates a cross-sectional view of one embodiment of a male coupling 100 configured to connect to a female threaded coupling 102, where the male coupling 100 and the female threaded coupling 102 are in the uncoupled position.

FIG. 1B illustrates a cross-sectional view of the male coupling 100 and the female threaded coupling 102 in the coupled position.

FIGS. 3A-3D illustrate cross-sectional views of portions of the male coupling 100 and the female threaded coupling 102 at various stages during the coupling operation.

FIGS. 4A-4C illustrate cross-sectional views of portions of the male coupling 100 and the female threaded coupling 102 at various stages during the uncoupling operation.

FIGS. 5A-5C illustrate cross-sectional views of the male coupling 100 and the female coupling 102 in the coupling position, with alternative biasing elements.

DETAILED DESCRIPTION

Figure 2:
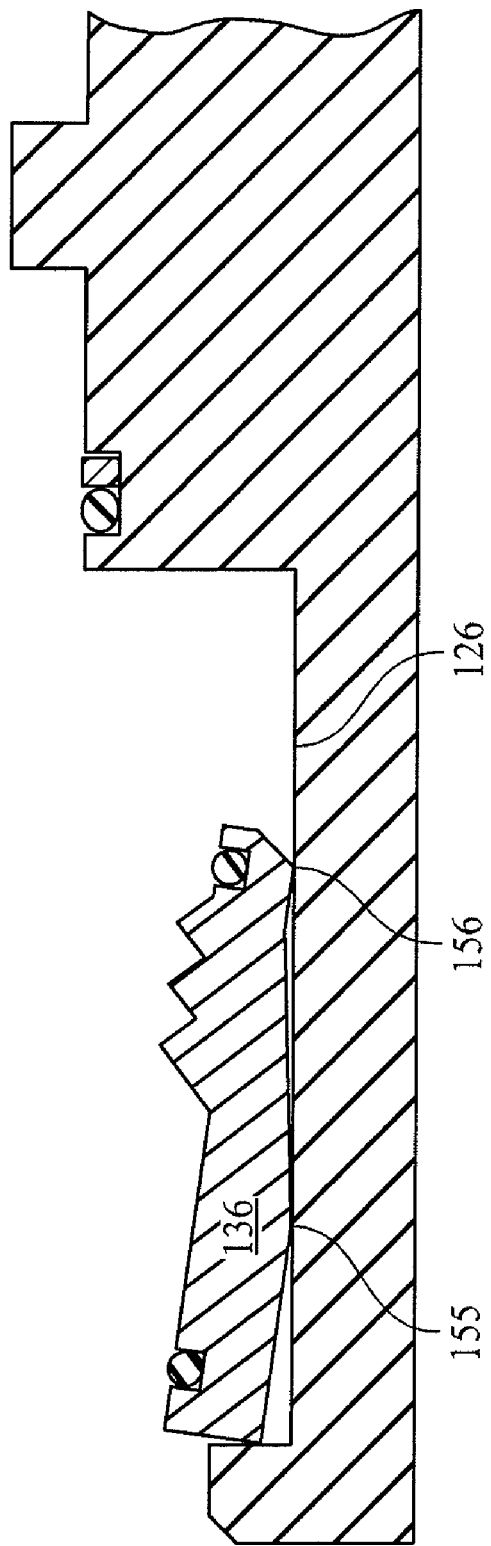
FIG. 2 illustrates a cross-sectional view of one embodiment of a locking member segment 136 in its releasing position.

Certain terminology will be used in the foregoing description for convenience in reference only and will not be limiting. The terms "forward" and "rearward" with respect to each component of the coupling assembly will refer to direction towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline of the coupling assembly. The terms "upward" and "downward" will refer to directions as taken in the drawings in connection with which the terminology is used. All foregoing terms mentioned above include the normal derivative and equivalents thereof.

Illustrated in FIG. 1A is a cross-sectional view of one embodiment of a male coupling 100 configured to be coupled to and separable from a female coupling, such as, for example, a female threaded coupling 102. Together, the male coupling 100 and the female threaded coupling 102 operate as a push-to-connect type coupling assembly, which will be discussed in further detail below. In the illustrated embodiment, the female threaded coupling 102 is a female threaded port, such as a standard female threaded port. In one embodiment, the standard female threaded port can be an SAE O-ring boss port. In alternative embodiments, the standard female threaded port can be ISO, DIN or BSPP O-ring ports.

Illustrated in FIG. 1B is a cross-sectional view of the male coupling 100 and the female threaded coupling 102 in a coupled position. In the coupled position, the male coupling 100 and the female threaded coupling 102 function as a coupling assembly to transmit fluid therethrough. Both the male coupling 100 and the female threaded coupling 102 share the same central longitudinal axis A when they are in the coupled position as shown in FIG. 1B. In one embodiment, the male coupling 100 and/or the female threaded coupling 102 can be formed of stainless steel. In alternative embodiments, the male coupling 100 and/or the female threaded coupling 102 can be formed of other materials such as carbon steel, brass, aluminum, and plastic.

With reference to FIGS. 1A and 1B, the female threaded coupling 102 includes a receiving portion having a receiving end 104 and a remote portion (not shown) having a remote end (not shown). Extending through the female threaded coupling 102 between the receiving end 104 and the remote end (not shown) is a passageway 106. The remote portion (not shown) of the female threaded coupling 102 can include external threads (not shown) for attachment to a separate component (not shown) or can be integral with a pump, valve, manifold, or other apparatus.

The female threaded coupling 102 also includes a chamfered surface 108 that extends rearward and inward from the receiving end 104. A set of internal threads 110 extend rearward from the chamfered surface 108. As shown in FIGS. 1A and 1B, the internal threads 110 are triangular-shaped when viewed in cross-section. In alternative embodiments, the threads can take the form of other shapes when viewed in cross-section (e.g., trapezoidal, square, or rectangular).

In the illustrated embodiment, the male coupling 100 includes a body 112 having an optional collar 114 that separates a leading portion having a leading end 116 and a trailing portion (not shown) having a trailing end (not shown). Extending through the male coupling 100 from the leading end 116 to the trailing end (not shown) is a passageway 118. In one embodiment (not shown), the trailing portion of the male coupling 100 includes a hose nipple for receiving a hose. In an alternative embodiment (not shown), the trailing portion may be provided with external threads for attachment to a threaded coupling of another component. The collar 114 may include flats (not shown) for engagement by a wrench when the trailing portion (not shown) is provided with external threads. Additionally, it will be appreciated that the body 112 can comprise two or more separate parts that are assembled together (e.g., via threaded joints) to facilitate assembly of the male coupling 100.

The leading portion of the male coupling 100 includes a first outer cylindrical surface 120 and a second outer cylindrical surface 122 that are separated from each other by an outwardly facing annular groove 124 that extends radially inward from the first and second cylindrical surfaces 120, 122. The groove 124 is at least partially defined by a third outer cylindrical surface 126 that is separated from the second outer surface 122 by a shoulder 128. In the illustrated embodiment, the first outer surface 120 has an outer diameter sized to be received by the internal threads 110 of the female threaded coupling 102. The first outer surface 120 has an outer diameter that is less than the outer diameter of the second outer surface 122, but greater than the outer diameter of the third outer surface 126.

The second outer surface 122 of the body 112 includes an outwardly facing annular groove 129 extending radially inward therefrom. Positioned within the groove 129 are a support ring 130 constructed of rigid plastic, leather, or hard rubber and an annular seal 132 constructed of neoprene or other suitable sealing material. The support ring 130 serves to protect the annular seal 132 from damage when the coupling assembly is used in high-pressure applications. In another embodiment (not shown), the support ring 130 may be eliminated when the coupling assembly is used in low-pressure applications.

The male coupling 100 further includes a locking member positioned within the groove 124. The locking member is in the form of separate locking member segments 136 that, together, form the locking member. In the illustrated embodiment, the locking member includes four locking member segments 136. In alternative embodiments, the locking member can include a different number of locking member segments.

Each locking member segment 136 includes a forward end 138, a rearward end 140, a first outer surface 142 extending rearward from the forward end 138, and a second outer surface 144 extending forward from the rearward end 140. Separating the first and second outer surfaces 142, 144 is a retaining formation that is configured to mesh with and engage the internal threads 110 of the female threaded coupling 102 when the male coupling 100 is inserted into the female threaded coupling 102, which is discussed in further detail below. In the illustrated embodiment, the retaining formation includes an external partial threaded formation 146. The partial threaded formation 146 projects outward from the groove 124 beyond the first exterior surface 120 of the body 112. The threaded formation 146 is characterized as being "partial" due to the fact that the ratcheting locking member is comprised of locking member segments 136. Hence, the partial threaded formation 146 of each locking member segment 136 comprises only a portion of a threaded formation. However, it will be appreciated that the locking member segments 136, together, form a threaded formation, although the threads may not be continuous since adjacent locking member segments 136 will have a small space in between them.

In the illustrated embodiment, the partial threaded formation 146 includes three triangular-shaped threads 146a-c when viewed in cross-section. However, in alternative embodiments (not shown), the partial threaded formation 146 can include a different number of threads and/or the threads can take the form of other shapes when viewed in cross-section (e.g., square, rectangular, or trapezoidal), so long as they are capable of meshing with and engaging the internal threads 110 of the female threaded coupling 102. Additionally, in alternative embodiments (not shown), the retaining formation can include a plurality of discrete radially outward extending projections or protrusions that are capable of engaging the internal threads 110 of the female threaded coupling 102. In these embodiments, the plurality of discrete radially outward extending projections or protrusions can take the form of any shape and can be arranged in any pattern, so long as they are capable of engaging the internal threads 110 of the female threaded coupling 102. Moreover, in an alternative embodiment (not shown), the retaining formation can include a helically-shaped wire that is provided in a helically-shaped groove in the locking member segments 136. In this embodiment, the helically-shaped wire would be configured to mesh with and engage the internal threads 110 of the female threaded coupling 102.

In the illustrated embodiment, each locking member segment 136 also includes a first inner surface 148 extending rearward from the forward end 138, a second inner surface 150 extending from the rearward end 140, a third inner surface 152 extending rearward from the first inner surface 148, and a fourth inner surface 154 joining the third inner surface 152 to the second inner surface 150. As shown in FIGS. 1A and 1B, the first and third inner surfaces 148, 152 are oriented at an angle B relative to each other, such that an edge 155 is formed between the first inner surface 148 and the third inner surface 152. The edge 155 defines a pivot axis (extending out of the drawing) about which each locking member segment 136 pivots. The pivot axis of each locking member segment 136 is spaced from and oriented perpendicular to the longitudinal axis A. Additionally, the second and fourth inner surfaces 150, 154 are oriented at an angle C relative to each other, such that an edge 156 is formed between the second inner surface 150 and the fourth inner surface 154.

Due to the edge 155, each locking member segment 136 is capable of pivoting between a first position (e.g., a locking position) and a second position (e.g., a releasing position). In the locking position, the first inner surface 148 of each locking member segment 136 abuts against the third outer surface 126 of the body 112 as shown in FIGS. 1A and 1B. In the releasing position, each locking member segment 136 is pivoted about the edge 155 in the clockwise direction, such that the edge 156 abuts against the third outer surface 126 of the body 112 as shown in FIG. 2. It will be appreciated, however, that the releasing position does not require the edge 156 to abut against the third outer surface 126 of the body 112. Instead, each locking member segment 136 need only pivot in the clockwise direction a sufficient amount to provide clearance between the outer extremities of the partial threaded formation 146 of the locking member segments 136 and the inner extremities of the internal threads 110 of the female threaded coupling 102.

Provided adjacent to the rearward end 140 of each locking member segment 136 is an outwardly facing groove 158 extending radially inward from the second outer surface 144. Together, the grooves 158 in the locking member segments 136 form an annular groove configured to receive an annular resilient, biasing element 160. The biasing element 160, which wraps around all of the locking member segments 136, is configured to bias each locking member segment 136 to its releasing position as shown in FIG. 2. The biasing element 160 can also assist in retaining the locking member segments 136 in the groove 124. In one embodiment, the biasing element 160 is an O-ring. In alternative embodiments, the biasing element 160 can be a garter spring, a split retaining ring, or an elastomeric or plastic ring. In another alternative embodiment (not shown), a biasing element is not employed in the male coupling 100 to bias each locking member segment 136 to its releasing position.

Provided adjacent to the forward end 138 of each locking member segment 136 is an outwardly facing groove 162 extending radially inward from the first outer surface 142. Together, the grooves 162 in all of the locking member segments 136 essentially form an annular groove configured to receive an annular retaining element 164. The retaining element 164, which wraps around all of the locking member segments 136, is also configured to assist in retaining the locking member segments 136 in the groove 124. In one embodiment, the retaining element 164 is an O-ring. In alternative embodiments, the retaining element 164 can be a garter spring, a split retaining ring, or an elastomeric or plastic ring. It will be appreciated that the retaining element 164 may not only retain the locking member segments 136 in the groove 124, but it may also create a biasing force that attempts to urge each locking member segment 136 to its locking position. In this case, the retaining element 164 is appropriately selected to ensure that its biasing force on the locking member segments 136 is less than the biasing force created by the biasing element 160, thereby ensuring that the locking member segments 136 are biased in the releasing position as shown in FIG. 2.

The male coupling 100 also includes a locking sleeve 166 disposed about the body 112 in an axially movable arrangement relative thereto and positioned between the locking member segments 136 and the collar 114. The locking sleeve 166 includes a locking portion 168, a sealing portion 170, and a shoulder portion 172 that joins the locking and sealing portions 168, 170 together. Although the figures represent only one embodiment of the locking sleeve 166, it will be appreciated that the locking sleeve 166 may be embodied differently depending on the design.

The locking portion 168 includes an first inner cylindrical surface 174, a first shoulder 176 that extends radially outward from the first inner surface 174, a first outer cylindrical surface 178, and a tapered surface 180 that extends forward and inward from the first outer surface 178. The first inner surface 174 of the locking sleeve 166 is sized to receive the third outer surface 126 of the body 112.

The sealing portion 170 includes a second inner cylindrical surface 182 and a second outer cylindrical surface 184. Optionally, the second outer surface 184 may be provided with a textured surface (e.g., a diamond knurled surface) to assist a user in grasping the surface. The second inner surface 182 of the locking sleeve 166 is sized to receive the second outer surface 122 of the body 112. Not only is the second inner surface 182 of the locking sleeve 166 sized to receive the second outer surface 122 of the body 112, but it is also sized to receive and sealingly engage the annular seal 132 in the groove 129, thereby preventing dust or other contaminants from entering the area forward of the annular seal 132 and keeping the fluid pressure inside the male coupling 100 and the female threaded coupling 102. The second inner surface 182 of the locking sleeve 166 is also sized to receive the support ring 130 in the groove 129.

The shoulder portion 172 includes a third outer cylindrical surface 186, a second shoulder 188 that extends radially outward from the third outer surface 186, a third inner cylindrical surface 190, and a third shoulder 192 that extends radially outward from the third inner surface 190. Disposed about the third outer surface 186 of the locking sleeve 166 is an annular seal 194 that may be constructed of neoprene or other suitable sealing material and is configured to sealingly engage the chamfered surface 108 of the female threaded coupling 102. In the illustrated embodiment, the annular seal 194 has a smaller outer diameter than the annular seal 132.

As described above, the locking sleeve 166 is disposed about the body 112 in an axially movable arrangement relative thereto, such that the locking sleeve 166 is movable between a first position (e.g., a forward position) and a second position (e.g., a rearward position). Axial travel of the locking sleeve 166 is limited in the rearward direction by the shoulder 128 of the body 112 and in the forward direction by the rearward end of each locking member segment 136. The locking sleeve 166 is in its forward position as shown in FIGS. 1A and 1B.

In the illustrated embodiment, a gap 196 is provided between the shoulder 176 of the locking sleeve 166 and the shoulder 128 of the body 112. Positioned within the gap 196 is a biasing element 198 configured to bias the locking sleeve 166 to its forward position as shown in FIGS. 1A and 1B. In the illustrated embodiment, the biasing element 198 is a coil spring. In alternative embodiments, the biasing element 198 can include a wave washer, O-ring, or elastomeric sleeve or gasket. To the extent that an O-ring or gasket would be employed as the biasing element, it will be appreciated that this element would be configured to permit at least some fluid to enter the gap 196 to create a pressure imbalance in the coupling assembly, which will be described in more detail below. When the locking sleeve 166 is moved to its forward position, the locking member segments 136 are moved to their locking positions. In this position, the locking member segments 136 are prevented from being moved to their releasing positions. Therefore, to permit the locking member segments 136 to move back to their releasing positions, the locking sleeve 166 must be moved to its rearward position, which will be described in more detail below.

To couple the male coupling 100 to the female threaded coupling 102, the locking sleeve 166 is first moved to its rearward position (in the direction of arrow D) against the urging of the biasing element 198. During movement of the locking sleeve 166 to its rearward position, each locking member segment 136 begins to pivot clockwise (in the direction of arrow E) about its edge 155 due to the resiliency of the biasing element 160, thereby causing each locking member segment 136 to move toward its releasing position (FIG. 3A).

Once the locking sleeve 166 is in its rearward position and each locking member segment 136 is in its releasing position (FIG. 3B), the leading portion of the male coupling 100 can be inserted into the receiving portion of the female threaded coupling 102 until the partial threaded formation 146 is located within the internal threads 110 of the female threaded coupling 102 (FIG. 3C). Once in this position, the locking sleeve 166 is released, permitting it to "spring back" toward its forward position due to the resiliency of the biasing element 198. While the locking sleeve 166 is moving forward from its rearward position to its forward position, the tapered surface 180 of the locking portion 168 of the locking sleeve 166 engages the second inner surface 150 of each locking member segment 136. This engagement forces each locking member segment 136 to pivot counterclockwise (in the direction of arrow F) about its edge 155 against the urging of the biasing element 160, thereby causing each locking member segment 136 to move toward its locking position.

Upon continued forward movement of the locking sleeve 166 toward its forward position, the locking portion 168 of the locking sleeve 166 continues to force the locking member segments 136 towards their locking positions. Once in their locking positions, the partial thread formation 146 of the locking member segments 136 mesh with and engage the internal threads 110 of the female threaded coupling 102 (FIG. 3D), thereby preventing the withdrawal of the male coupling 100 from the female threaded coupling 102. In this position, the engagement of the partial threaded formation 146 of the locking member segments 136 to the internal threads 110 of the female threaded coupling 102 prevents the withdrawal of the male coupling 100 from the female threaded coupling 102. Additionally, once in this position, the locking portion 168 of the locking sleeve 166 is wedged between the fourth inner surface 154 of each locking member segment 136 and the third outer surface 126 of the body 112, thereby preventing the locking member segments 136 from moving to their releasing positions.

When the male coupling 100 and the female threaded coupling 102 are in the coupled position (FIG. 3D), the annular seal 194 on the third outer surface 186 of the locking sleeve 166 is sealingly engaged to the chamfered surface 108 of the female threaded coupling 102 due, at least in part, to the biasing force of the biasing element 198 urging the locking sleeve 166 to its forward position. Additionally, upon pressurization of the male coupling 100 and the female threaded coupling 102, a pressure imbalance is created due to the annular seal 132 having a greater outer diameter than the annular seal 194, thereby forcing the locking sleeve 166 to move forward imparting an additional sealing force of the annular seal 194. This sealing engagement between the male coupling 100 and the female threaded coupling 102 prevents fluid leakage therebetween. Moreover, when the male coupling 100 and the female threaded coupling 102 are in the coupled position, the annular seal 132 on the body 112 is sealingly engaged to the second inner surface 182 of the locking sleeve 166, thereby preventing dust or other contaminants from entering the area around the biasing element 198.

When it is desired to uncouple the male coupling 100 from the female threaded coupling 102, the locking sleeve 166 is first moved to its rearward position (in the direction of arrow G) against the urging of the biasing element 198. During movement of the locking sleeve 166 to its rearward position, each locking member segment 136 begins to pivot clockwise (in the direction of arrow H) about its edge 155 due to the resiliency of the biasing element 160, thereby causing each locking member segment 136 to move toward its releasing position (FIG. 4A). To facilitate the movement of the locking sleeve 166 from its forward position to its rearward position, a tool may be inserted between the shoulder 188 of the locking sleeve 166 and the receiving end 104 of the female threaded coupling 102 to assist in urging the locking sleeve rearwardly.

Figure 4C:
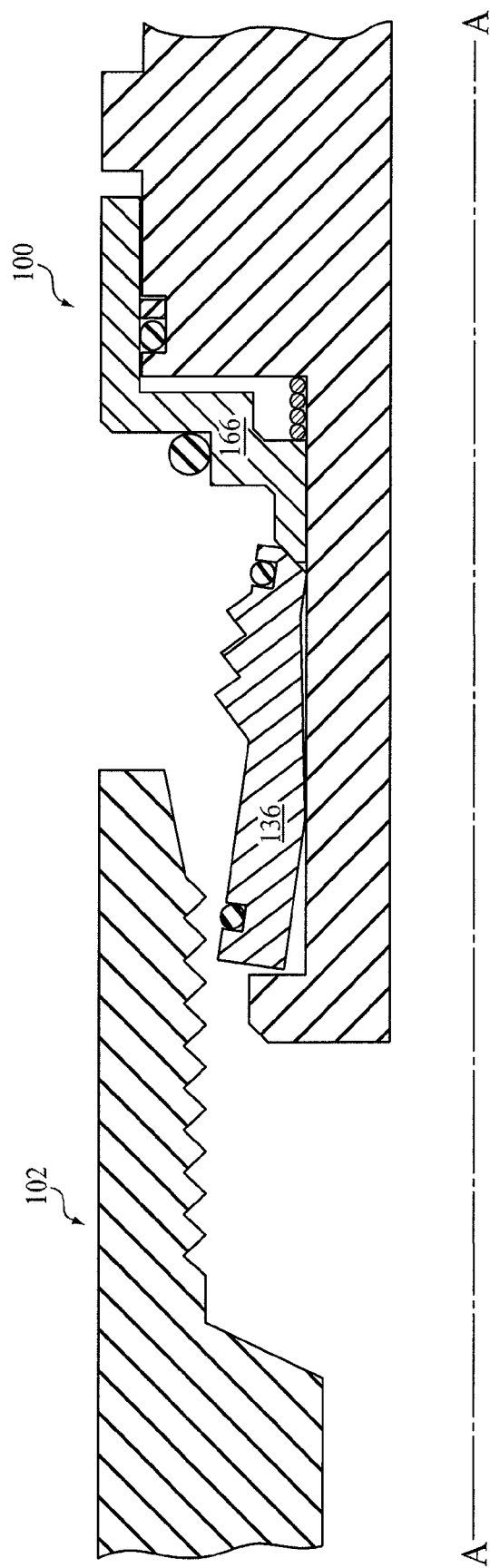

Once the locking sleeve 166 is in its rearward position and each locking member segment 136 is in its releasing position (FIG. 4B), each locking member segment 136 is collapsed providing the necessary clearance to permit the male coupling 100 to axially slide past the internal threads 110 of the female threaded coupling 102. Accordingly, the male coupling 100 can be disconnected from the female threaded coupling 102 resulting in the two components being in the uncoupled position (FIG. 4C).

There are several potential advantages to the male coupling 100 discussed above. First, since it is capable of connecting to a standard female threaded coupling, a female adapter can be eliminated reducing cost as well as a leak path. Additionally, customers would no longer be required to purchase all of their hoses from the manufacturer of the coupling assembly.

For the embodiments discussed above, it will be appreciated that one or more of the cylindrical surfaces discussed above may be replaced with a surface having a linear profile that is angled relative to the longitudinal axis A of the coupling assembly (e.g., tapered surfaces) or a curved surface (e.g., convex or concave surfaces). Additionally, it will be appreciated that one or more of the tapered or chamfered surfaces discussed above may be replaced with a cylindrical surface relative to the longitudinal axis A of the coupling assembly (e.g., tapered surfaces) or a curved surface (e.g., convex or concave surfaces).

Furthermore, it will be appreciated that the locking members discussed above (ratcheting or non-ratcheting) can be modified to be used on a female coupling for connection to a male threaded coupling. For example, the locking member segments 136 used in the male coupling 100 described above can be rotated 180 degrees, so that the partial threaded formation 146 of each locking member segment 136 can engage the external threads of a male threaded coupling.

Figure 5C:
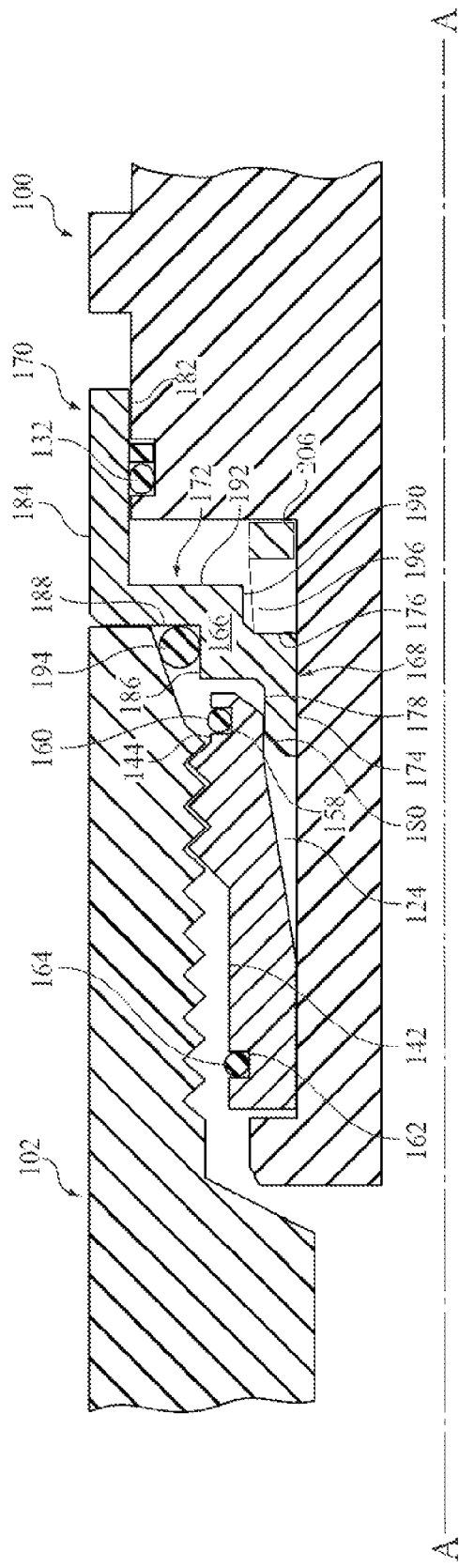

FIGS. 5A-5C illustrate cross-sectional views of the male coupling 100 and the female coupling 102 in the coupling position, with alternative biasing elements. In FIG. 5A, the O-ring that was depicted as biasing element 160 in FIG. 1B has been replaced with a garter spring 202. In FIG. 5B, the O-ring that was depicted as biasing element 160 in FIG. 1B has been replaced with a split retaining ring 204. In FIG. 5C, the coil spring that was depicted as biasing element 198 in FIGS. 1A-B has been replaced with a wave washer 206.

It will be appreciated that the male couplings described above have applicability in areas other than fluid connectors. For example, a device that includes one of the male couplings described above, particularly the ratcheting locking member and the release sleeve, can be used as a push-to-connect type fastening device that connects to a female thread in a separate device. In this example, the components need not transport fluid.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A coupling assembly comprising:
   a female coupling including a receiving portion having internal threads provided therein; and
   a male coupling comprising:
      a body having a groove disposed on an outer surface, the body further having a passageway extending therethrough;
      a locking member disposed in the groove of the body and pivotally movable between locking and releasing positions, the locking member having a leading end, a trailing end, and a retaining formation which engages the internal threads of the female coupling when the locking member is in its locking position;
      a retaining element which retains the locking member in the groove, the retaining element being disposed between the leading end of the locking member and the retaining formation;
      a resilient biasing element which biases the locking member toward the releasing position; and
      a locking sleeve disposed about and axially movable with respect to the body between first and second positions;
      wherein, after insertion of the male coupling into the female coupling, the locking sleeve is biased towards its first position forcing the locking member to move to its locking position causing the retaining formation of the locking member to engage the internal threads of the female coupling, thereby locking the male coupling and the female coupling together; a first annular seal between an outer surface of the male coupling and an inner surface of a sealing portion of the locking sleeve; and a second annular seal provided on the locking sleeve which sealingly engages at least one surface of the female coupling when the male coupling is connected to the female coupling, wherein the first annular seal has a larger outer diameter than the second annular seal.

2. The coupling assembly of claim 1, wherein the female coupling is a female threaded port.

3. The coupling assembly of claim 1, wherein the resilient biasing element is an O-ring, garter spring, or split retaining ring.

4. The coupling assembly of claim 1, wherein the locking member includes a number of locking member segments.

5. The coupling assembly of claim 1, wherein the retaining formation includes a partial threaded formation.

6. The coupling assembly of claim 1, further comprising a biasing element disposed between the locking sleeve and the body to bias the locking sleeve to its first position.

7. The coupling assembly of claim 6, wherein the biasing element is a coil spring or a wave washer.

8. The coupling assembly of claim 1, wherein, upon movement of the locking sleeve from its first position to its second position, the locking member is moved to its releasing position causing the retaining formation of the locking member to disengage from the internal threads of the female coupling, thereby permitting withdrawal of the male coupling from the female coupling.

9. A male coupling connectable to and separable from a female coupling, the male coupling comprising:

a body having a passageway extending therethrough;

a plurality of locking member segments disposed about the body, each of which is pivotally movable between locking and releasing positions and includes a retaining formation configured to engage the female coupling when in its locking position, and disengage from the female coupling when in its releasing position;

an annular retaining element which biases the locking member segments towards the locking position;

a resilient biasing element which biases the locking member segments toward the releasing position; and a locking sleeve disposed about and axially moveable with respect to the body between first and second positions, the locking sleeve forcing the locking member segments to their respective locking positions when the locking sleeve is moved to its first position, wherein, upon movement of the locking sleeve from its first position to its second position, the locking member segments move to their respective releasing positions;

a first annular seal between an outer surface of the male coupling and an inner surface of a sealing portion of the locking sleeve; and a second annular seal provided on the locking sleeve and configured to sealingly engage at least one surface of the female coupling when the male coupling is connected to the female coupling, wherein the first annular seal has a larger outer diameter than the second annular seal.

10. The male coupling of claim 9, wherein the retaining formation includes a partial threaded formation.

11. The male coupling of claim 9, further comprising a biasing element disposed between the locking sleeve and the body to bias the locking sleeve to its first position.

12. The male coupling of claim 11, wherein the biasing element is a coil spring or a wave washer.

13. The male coupling of claim 9, wherein, upon movement of the locking sleeve from its first position to its second position, the plurality of locking member segments are moved to the releasing positions, thereby permitting withdrawal of the male coupling from the female coupling.

14. A male coupling connectable to and separable from a female coupling, the male coupling comprising:

a body having a passageway extending therethrough;

a plurality of locking member segments disposed about the body, each of which is pivotally movable between locking and releasing positions and includes a partial threaded formation configured to engage the female coupling when in its locking position, and disengage from the female coupling when in its releasing position; and a locking sleeve disposed about and axially moveable with respect to the body between first and second positions, the locking sleeve forcing the locking member segments to their respective locking positions when the locking sleeve is moved to its first position, wherein the locking sleeve is biased to its first position to maintain the locking member in its locking position; and a first annular seal provided between an outer surface of the male coupling and an inner surface of a sealing portion of the locking sleeve; and a second annular seal disposed about the locking sleeve and configured to compress against the female coupling when the male coupling is connected to the female coupling, wherein the first annular seal has a larger outer diameter than the second annular seal, wherein, upon movement of the locking sleeve from its first position to its second position, the locking member segments move to their respective releasing positions, wherein, upon releasing the locking sleeve to its first position, the locking sleeve forces the locking member segments to move to their respective locking positions causing the partial threaded formation of each locking member segment to pivot to the locking position coupling.

15. The male coupling of claim 14, further comprising a biasing element disposed between the locking sleeve and the body to bias the locking sleeve to its first position.

16. The male coupling of claim 15, wherein the biasing element is a coil spring or a wave washer.

17. The male coupling of claim 14, further comprising a resilient biasing element configured to bias the locking member segments toward the releasing position.

18. The male coupling of claim 14, further comprising an annular retaining element configured to bias the plurality of locking member segments towards the locking position.

* * * * *